United States Patent
Maitani et al.

(10) Patent No.: US 10,175,709 B2
(45) Date of Patent: Jan. 8, 2019

(54) CONSUMER ELECTRIC POWER CONTROL SYSTEM AND CONSUMER ELECTRIC POWER CONTROL METHOD

(71) Applicant: Mitsubishi Electric Corporation, Chiyoda-ku (JP)

(72) Inventors: Hiroshi Maitani, Chiyoda-ku (JP); Takaya Yamamoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 187 days.

(21) Appl. No.: 14/781,690

(22) PCT Filed: Mar. 24, 2014

(86) PCT No.: PCT/JP2014/057966
§ 371 (c)(1),
(2) Date: Oct. 1, 2015

(87) PCT Pub. No.: WO2014/185149
PCT Pub. Date: Nov. 20, 2014

(65) Prior Publication Data
US 2016/0041574 A1  Feb. 11, 2016

(30) Foreign Application Priority Data
May 16, 2013 (JP) .................. 2013-104157

(51) Int. Cl.
*G05F 1/66* (2006.01)
*G05B 15/02* (2006.01)
(Continued)

(52) U.S. Cl.
CPC .............. *G05F 1/66* (2013.01); *G05B 15/02* (2013.01); *G06Q 50/16* (2013.01); *H02J 3/14* (2013.01);
(Continued)

(58) Field of Classification Search
CPC . G05F 1/66; G05B 15/02; G06Q 50/16; H02J 3/14; H02J 13/0006; Y02P 80/11; Y02B 70/3225; Y04S 20/222
(Continued)

(56) References Cited

U.S. PATENT DOCUMENTS

| 8,989,910 B1* | 3/2015 | Klots ................. G06Q 50/06 700/291 |
| 2007/0067056 A1* | 3/2007 | Nishinohara .... G05B 19/41885 700/97 |

(Continued)

FOREIGN PATENT DOCUMENTS

| JP | 2003-23730 A | 1/2003 |
| JP | 4910020 B2 | 4/2012 |

(Continued)

OTHER PUBLICATIONS

International Search Report dated Apr. 15, 2014, in PCT/JP2014/057966 filed Mar. 24, 2014.

*Primary Examiner* — Robert E Fennema
*Assistant Examiner* — Jigneshkumar C Patel
(74) *Attorney, Agent, or Firm* — Oblon, McClelland, Maier & Neustadt, L.L.P.

(57) ABSTRACT

A consumer electric power control system includes a consumer data storage unit, a consumer daily data creation unit, an electric power instruction value acquisition unit, an electric power reduction scenario creation unit, a consumer data prediction unit, a condition change indicator calculation unit configured to calculate a plurality of condition change indicators for a plurality of electric power reduction scenarios, each of the plurality of condition change indicators representing a degree of difference in tendency between consumer prediction data and consumer daily data, an equipment operation determination unit configured to determine one of the plurality of electric power reduction scenarios based on the plurality of condition change indicators and determine an equipment operation pattern based on the determined one electric power reduction scenario; and an equipment operation control unit configured to control vari- (Continued)

ous types of equipment based on the determined equipment operation pattern.

10 Claims, 5 Drawing Sheets

(51) Int. Cl.
  *H02J 3/14* (2006.01)
  *H02J 13/00* (2006.01)
  *G06Q 50/16* (2012.01)
(52) U.S. Cl.
  CPC ....... *H02J 13/0006* (2013.01); *Y02B 70/3225* (2013.01); *Y02P 80/11* (2015.11); *Y04S 20/222* (2013.01)
(58) Field of Classification Search
  USPC .......................................................... 700/291
  See application file for complete search history.

(56) References Cited

U.S. PATENT DOCUMENTS

| 2010/0324962 | A1* | 12/2010 | Nesler | G01R 21/133 |
| | | | | 705/7.36 |
| 2011/0046806 | A1* | 2/2011 | Nagel | H04L 67/125 |
| | | | | 700/291 |
| 2012/0310431 | A1* | 12/2012 | Cheetham | G06Q 50/06 |
| | | | | 700/295 |
| 2013/0140893 | A1* | 6/2013 | Ikeda | G06Q 50/06 |
| | | | | 307/35 |

FOREIGN PATENT DOCUMENTS

| JP | 2012-191707 A | 10/2012 |
| JP | 2013-90389 A | 5/2013 |
| WO | WO 2013/121700 A1 | 8/2013 |

* cited by examiner

ALTHOUGH DATA A' AND DATA B' HAVE SAME EUCLIDEAN DISTANCE FROM CENTERS OF DATA GROUP A AND DATA GROUP B RESPECTIVELY TO WHICH DATA A' AND DATA B' BELONG RESPECTIVELY, VARIANCE OF DATA GROUP A IS SMALLER, AND HENCE "MAHALANOBIS DISTANCE OF DATA A' > MAHALANOBIS DISTANCE OF DATA B'" IS SATISFIED IN TERMS OF MAHALANOBIS DISTANCE.

CONSUMER ELECTRIC POWER CONTROL SYSTEM AND CONSUMER ELECTRIC POWER CONTROL METHOD

TECHNICAL FIELD

The present invention relates to a consumer electric power control system and a consumer electric power control method for managing demand response.

BACKGROUND ART

There is known a scheme called "demand response" for a consumer to reduce usage of electric power depending on settings of electricity charges or payment of incentives when an electric power price surges or reliability of an electric power grid reduces. The demand response in the former case, which depends on the settings of electricity charges, is a scheme to prompt the consumer to reduce the usage of electric power voluntarily by setting peak charges at the time of shortage of electric power supply higher than ordinary charges. On the other hand, the demand response in the latter case, which depends on the payment of incentives, is a scheme to make a contract in advance between an electric power provider or an energy manager and the consumer in which the consumer receives a consideration payment in exchange for accepting a demand adjustment at the time of shortage of electric power supply.

In the latter scheme, the consumer, who makes demand adjustment of the power at the time of the shortage of electric power supply, needs to grasp in advance the amount of electric power currently used in equipment and the amount of electric power that can be reduced to ensure the necessary electric power reduction amount. For example, in an office building, the electric power used for air-conditioning and lighting accounts for a large proportion of the electric power consumption of the entire building.

For example, regarding air-conditioning equipment targeted for electric power reduction, there is known a method including predicting electric power consumption characteristics of an air-conditioning apparatus and heat capacity characteristics of a building, thereby controlling the air-conditioning apparatus to maintain the room temperature as comfortable as possible while satisfying the request of demand response to reduce the electric power (for example, Patent Literature 1).

Further, regarding various types of equipment in a plurality of managed areas targeted for electric power reduction, there is known a method including setting priorities among a population density in a floor, capability of equipment to reduce its electric power, a difference in attributes between residents in the floor (for example, VIP or guest), and other factors, to determine how much electric power is to be reduced for which equipment in which managed area, to thereby determine the equipment whose electric power is to be reduced (hereinafter referred to as "electric power reduction target equipment") and the amount of reduction thereof, based on the priorities, and distributing electric power to respective pieces of equipment (for example, Patent Literature 2).

CITATION LIST

Patent Literature

Patent Literature 1: Japanese Patent No. 4910020
Patent Literature 2: Japanese Unexamined Patent Application Publication No. 2012-191707

SUMMARY OF INVENTION

Technical Problem

However, the related-art method disclosed in Patent Literature 1 has a problem in that it is impossible to determine which equipment is to be reduced in electric power when other types of equipment are included because the related-art method targets electric power reduction only on the air-conditioning equipment.

Further, the related-art method disclosed in Patent Literature 2 has a problem in that it is difficult to make a fair rule to determine the priority because different types of equipment have different degrees of degradation of comfortability and convenience when 1 kW of electric power is reduced although the related-art makes a rule based on a plurality of different indicators such as a type of equipment and an environmental condition.

The present invention has been made to solve the above-mentioned problems, and an object of the present invention is to provide a consumer electric power control system and a consumer electric power control method capable of evaluating an influence on degradation of comfortability and convenience of different types of equipment using a single evaluation indicator and determining electric power reduction target equipment and the amount of reduction thereof in a case where an upper limit value of allowable electric power consumption is set by demand response for a consumer in an office building and a factory, which have various types of equipment such as equipment for air-conditioning and lighting used in a plurality of managed areas having different environmental conditions, human movements, equipment arrangements, and other conditions.

Solution to Problem

A consumer electric power control system according to the present invention includes a consumer data storage unit configured to store consumer data including equipment data indicating operating conditions of various types of equipment targeted for electric power management and environment data indicating operating environments of the various types of equipment targeted for electric power management, a consumer daily data creation unit configured to create consumer daily data based on the consumer data in a past stored in the consumer data storage unit, an electric power instruction value acquisition unit configured to acquire an electric power instruction value including data on an electric power reduction start time, an electric power reduction period, and an electric power reduction amount, an electric power reduction scenario creation unit configured to create a plurality of electric power reduction scenarios based on the electric power instruction value, each of the plurality of electric power reduction scenarios including a combination of a piece of electric power reduction target equipment, an electric power reduction amount, an electric power reduction start time, and an electric power reduction period, a consumer data prediction unit configured to predict and acquire consumer prediction data including the consumer data in a case where the various types of equipment are controlled based on each of the plurality of electric power reduction scenarios, a condition change indicator calculation unit configured to calculate a plurality of condition change indicators for the plurality of electric power reduction scenarios, each of the plurality of condition change indicators representing a degree of difference in tendency between the consumer prediction data and the consumer daily data, an equipment operation determination unit configured to determine one of the plurality of electric power reduction scenarios based on the plurality of condition change indicators and determine an equipment operation pattern based on the determined one of the plurality of electric power reduction scenarios, and an equipment operation control unit configured to control the various types of equipment based on the determined equipment operation pattern.

Advantageous Effects of Invention

The consumer electric power control system according to the present invention can evaluate the influence on degradation of comfortability and convenience of different types of equipment using the single evaluation indicator in the case where the upper limit value of allowable electric power consumption is set by the demand response, and hence can easily determine the electric power reduction target equipment and the amount of reduction thereof.

DESCRIPTION OF EMBODIMENTS

Embodiments of the present invention are described below with reference to the drawings. Note that, the present invention is not limited to the embodiments described below.

The present invention is realized as a system for controlling load equipment such as equipment for air-conditioning and lighting within a facility such as an office building, a store, and a factory of an electric power consumer.
Embodiment 1

Figure 1:
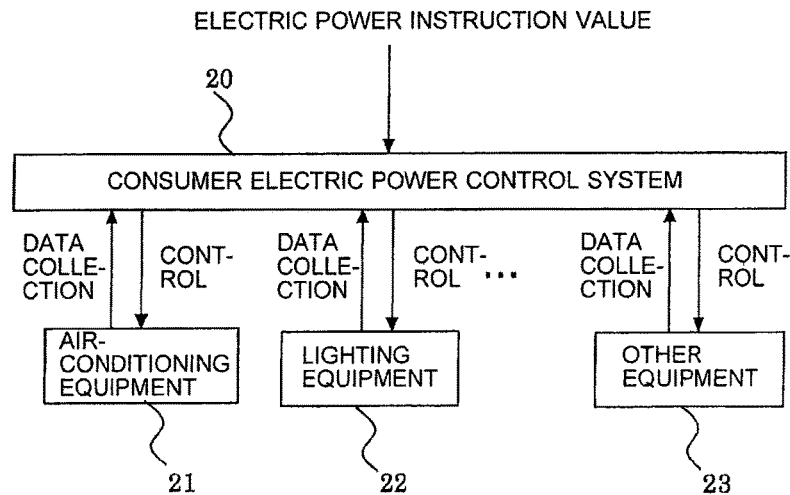
FIG. 1 is a configuration diagram illustrating a consumer electric power control system according to Embodiment 1 of the present invention.
Figure 2:
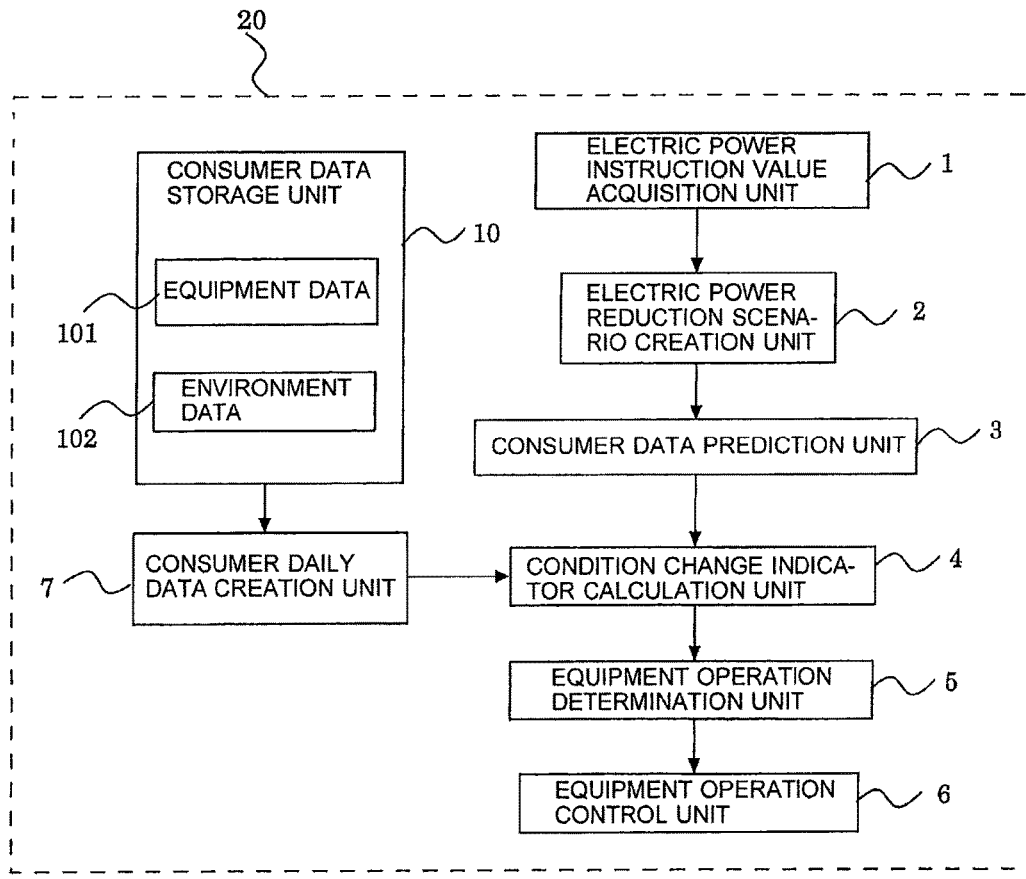
FIG. 2 is a functional block diagram illustrating the consumer electric power control system according to Embodiment 1 of the present invention.

FIG. 1 is a configuration diagram illustrating a consumer electric power control system 20 according to Embodiment 1 of the present invention, and FIG. 2 is a functional block diagram illustrating the consumer electric power control system 20 according to Embodiment 1 of the present invention.

An electric power instruction value acquisition unit 1 acquires electric power instruction values, which are data on an electric power reduction start time, an electric power reduction period, and an electric power reduction amount, from an electric power provider or an energy manager via a network or manual data input.

An electric power reduction scenario creation unit 2 determines how much electric power is to be reduced for which equipment based on the electric power instruction values, and creates an electric power reduction scenario, which is a combination of electric power reduction target equipment, an electric power reduction amount, an electric power reduction start time, and an electric power reduction period.

Equipment data 101 is data indicating operating conditions of various types of equipment targeted for electric power management, and environment data 102 is data indicating operating environments of various types of equipment targeted for electric power management. Each of these data is stored in a consumer data storage unit 10 regularly at predetermined intervals.

For example, the equipment data 101 of air-conditioning equipment 21 includes electric power consumption, a frequency, and a condition of refrigerant (for example, pressure and flow rate) of an outdoor unit as well as electric power consumption, an amount of sent air, and a wind direction of an indoor unit. In addition, the equipment data 101 of lighting equipment 22 includes electric power consumption and a dimming rate for each management unit. Further, for example, the environment data 102 of the air-conditioning equipment 21 includes an outdoor temperature, an outdoor humidity, an amount of solar radiation, an indoor temperature, and an indoor humidity. In addition, the environment data 102 of the lighting equipment 22 includes illumination intensity.

Note that, in addition to values measured by sensors, some pieces of these environment data 102 may be acquired through calculation of equipment characteristics data or other types of data or may be collected from an outside information source via the Internet or other networks.

The equipment data 101 and the environment data 102 are hereinafter collectively referred to as "consumer data".

A consumer data prediction unit 3 predicts and acquires consumer prediction data, which is the consumer data in a case where various types of equipment are controlled based on an electric power reduction scenario, which is different from a daily operation, during an electric power reduction period. For example, in the case of the air-conditioning equipment 21, the consumer data prediction unit 3 acquires a change in room temperature when the air-conditioning equipment 21 is controlled at a predetermined level of electric power or acquires other types of data.

A consumer daily data creation unit 7 creates consumer daily data, which is data on a daily change pattern of the consumer data based on past consumer data. The consumer daily data creation unit 7 extracts a consumer data group for a predetermined number of past days from the consumer data storage unit 10, and determines and acquires this data group as consumer daily data. The consumer daily data creation unit 7 selects data of days that are likely to have a similarity in operating conditions of the equipment with the current day, such as the past one week from the previous day, the past one month from the previous day, the same day of the previous year, and the day having the same environmental condition such as the maximum temperature and the average temperature.

In other cases, the consumer daily data creation unit 7 extracts consumer data until the current time on the current day and consumer data for the predetermined number of past days, acquires similarity degrees with the operation pattern of the current day, and determines and acquires a consumer data group of the past that is determined to have the maximum similarity with the current day as the consumer daily data.

A condition change indicator calculation unit 4 calculates a condition change indicator, which indicates a degree of dissimilarity in tendency between the consumer prediction data and the consumer daily data, and calculates a Mahalanobis distance representing the condition change indicator for each electric power reduction scenario. In other words, the condition change indicator calculation unit 4 calculates the Mahalanobis distance as the condition change indicator for every electric power reduction scenario based on the consumer prediction data and the consumer daily data.

An equipment operation determination unit 5 compares Mahalanobis distances of respective electric power reduction scenarios calculated by the condition change indicator calculation unit 4 with one another, determines an electric power reduction scenario having the smallest Mahalanobis distance as the one that degrades the least comfortability and convenience, and determines the electric power reduction scenario as an equipment operation pattern to be used during the electric power reduction period. Note that, the Mahalanobis distances are acquired as instantaneous values at time intervals of the consumer prediction data, and these values may be processed to obtain the maximum value, the average value, the integrated value, and the like during the electric power reduction period, to thereby use these processed values as the determination condition to determine the electric power reduction scenario.

An equipment operation control unit 6 controls the electric power reduction target equipment and non-electric power reduction target equipment based on the determined equipment operation pattern.

Next, the control of the air-conditioning equipment 21 and the lighting equipment 22 is described below as an example of operations of these various units.

The electric power instruction value acquisition unit 1 acquires electric power instruction values, which are data on an electric power reduction start time, an electric power reduction period, and an electric power reduction amount, from an electric power provider or an energy manager. Note that, these electric power instruction values are acquired automatically via a network several minutes to several hours in advance, on the previous day, or before the previous day. In other cases, these electric power instruction values are sent in another way such as delivery of a document, which does not involve a network, and the energy manager of the consumer inputs these values, to thereby be acquired by the electric power instruction value acquisition unit 1.

The electric power instruction values are represented by an absolute value of usable electric power, an absolute value of an electric power reduction amount, an electric power reduction ratio, and the like. When acquiring the electric power instruction values, the electric power reduction scenario creation unit 2 determines an electric power reduction amount allocation between the electric power of the air-conditioning equipment 21 and the electric power of the lighting equipment 22 based on the acquired electric power reduction amount. For example, when acquiring the electric power instruction values that indicate electric power reduction of 10%, the electric power reduction scenario creation unit 2 creates an electric power reduction scenario 1, which is a pattern of reducing electric power by 5% in the air-conditioning equipment 21 and the lighting equipment 22, respectively.

Note that, when creating an electric power reduction scenario, the electric power reduction scenario creation unit 2 may first create one standard scenario as an initial value, and then acquire a plurality of scenarios by finely adjusting allocation amounts to various types of equipment. Further, the electric power reduction scenario creation unit 2 may determine the allocation by referring to data on specifications of equipment such as rated power of the air-conditioning equipment 21 and the lighting equipment 22 and referring to the amount of electric power usage of past consumer data. The electric power reduction scenario creation unit 2 may also consider an area excluded from the electric power reduction targets such as a server room or a guest area, and set a restriction such as prohibiting the electric power reduction of equipment assigned to that area.

The consumer data prediction unit 3 predicts the consumer data in the case where the equipment is operated based on the electric power reduction scenario. In the case of the air-conditioning equipment 21, the consumer data prediction unit 3 predicts changes in operating condition of the air-conditioning apparatus, room temperature, and other conditions during the electric power reduction period. To predict these changes, the consumer data prediction unit 3 first predicts a heat load of air-conditioning. There is known a method of indicating a heat balance between the inside and the outside of the room as a model of a thermal network as a way of predicting the heat load of air-conditioning, and the model is constructed by identifying parameters of the thermal network in advance from past consumer operation data. Then, the consumer data prediction unit 3 predicts the change in environment such as the operating condition of the air-conditioning apparatus and room temperature in a case where usable electric power is restricted by predicting the head load of air-conditioning during the electric power reduction period through use of an outdoor temperature prediction value during the electric power reduction period, a room temperature before the start of electric power reduction, and other data that are acquired from weather forecasts or predicted from past environment data 102. Note that, the electric power consumed by the air-conditioning apparatus during that period is acquired by using a characteristic formula or data that indicates the relationship between the heat load of the air-conditioning apparatus and its electric power.

The consumer data prediction unit 3 creates a plurality of patterns of operation combinations of a plurality of air-conditioning apparatus, and then performs an optimization calculation for the consumer prediction data based on the electric power reduction scenario with the upper limit value of usable electric power consumption in the air-conditioning equipment 21 as an evaluation value and with the upper and lower limit values of room temperature as a constraint condition. After that, the consumer data prediction unit 3 acquires, as the consumer prediction data, an operation pattern of the air-conditioning apparatus satisfying the room temperature constraint condition at or below the electric power upper limit value, and the electric power and the room temperature in that pattern. For example, the constraint condition includes a change amount with respect to a set room temperature (for example, set room temperature±1), and this amount may be set to a different value depending on operating conditions of the building.

In the case of the lighting equipment 22, the consumer data prediction unit 3 holds an expression or data that indicates the relationship between the electric power, the dimming rate, and the illumination intensity of the lighting equipment 22, and predicts the change amount of electric power or illumination intensity in a case where the dimming rate is lowered. The consumer data prediction unit 3 creates a plurality of combinations of dimming patterns to set a dimming rate for each piece of lighting equipment, and then performs an optimization calculation for the prediction data based on the electric power reduction scenario with the upper limit value of usable electric power consumption in the lighting equipment 22 as an evaluation value and with the lower limit value of illumination intensity as a constraint condition, to thereby acquire, as the consumer prediction data, a dimming pattern satisfying the illumination intensity constraint condition at or below the electric power upper limit value, and the electric power and the illumination intensity in that pattern. For example, 300 lux or more of illumination intensity is set as the constraint condition, which is defined to be the illumination of the office environment to carry out a precise work according to the Ordinance on Health Standards in the Office conforming to the Industrial Safety and Health Law. The illumination intensity may be set to a different value as the constraint condition depending on the environment of the building and the like.

Note that, other equipment 23 is described later.

Figure 3:
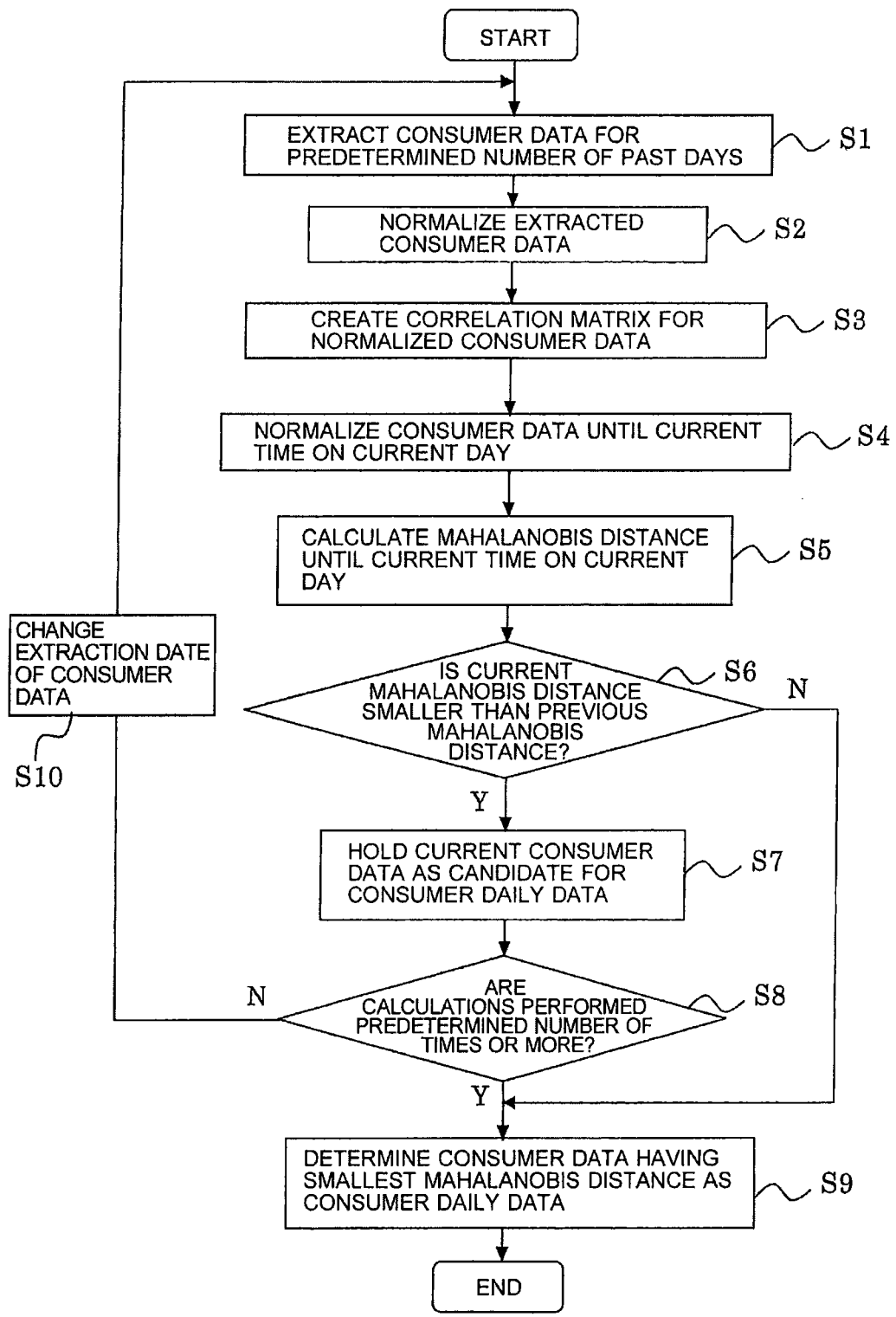
FIG. 3 is a processing flow diagram of a consumer daily data creation unit of the consumer electric power control system according to Embodiment 1 of the present invention.

FIG. 3 is a processing flow diagram of the consumer daily data creation unit 7 of the consumer electric power control system 20 according to Embodiment 1 of the present invention.

Next, the processing flow of the consumer daily data creation unit 7 creating consumer daily data is described below with reference to FIG. 3.

First, the consumer daily data creation unit 7 extracts consumer data for the predetermined number of past days from the consumer data storage unit 10 (S1), and normalizes each data item of the consumer data (S2). The normalization as used herein refers to a method of standardizing various types of measured data of the equipment data 101 and the environment data 102, which have different magnitudes and variances of respective physical quantities, such that these data each have an average of 1 and a variance of 1. Specifically, when there are N pieces of data for each of P data items, instead of using consumer data $x'_{np}$ (n=1, 2, . . . , N, p=1, 2, . . . , P), the consumer data calculated by Expression (1) is used.

[Math. 1]

$$x_{np} = (x'_{np} - xm_p)/\sigma_p \quad (1)$$

In Expression (1), $xm_p$ denotes an average value of pieces of data about the p-th data item and $\sigma_p$ denotes a variance of pieces of data about the p-th data item.

Then, the consumer daily data creation unit 7 acquires a correlation matrix for the normalized data, which represents a correlation relationship between respective data items (S3). The correlation matrix R is acquired by Expression (2) using the normalized consumer data $X=[x_1, x_2, \ldots, x_P]$ ($x_p=[x_{1p}, x_{2p}, \ldots, x_{np}]$).

[Math. 2]

$$R = \frac{1}{N} X^T X \left( R_{i,j} = \frac{1}{N} \sum_{n=1}^{N} x_{ni} x_{nj} \right) \quad (2)$$

Next, the consumer daily data creation unit 7 extracts consumer data until the current time from consumer data on the current day in the consumer data storage unit 10 and normalizes the data by Expression (1) (S4). Then, the consumer daily data creation unit 7 uses the normalized consumer data on the current day $t_n=[t_{n1}, t_{n2}, \ldots, t_{nM}]$ ($t_{nM}=[t_{1M}, t_{2M}, \ldots, t_{nM}]$) and the correlation matrix of the consumer data for the predetermined number of past days acquired by Expression (2) to calculate a Mahalanobis distance (MD), which represents a degree of deviation of consumer data until the current time on the current day from the tendency of the consumer data X, by Expression (3) (S5).

[Math. 3]

$$MD = (t_n R^{-1} t_n^T)/k \quad (3)$$

In Expression (3), k denotes the number of data samples.

Figure 4:
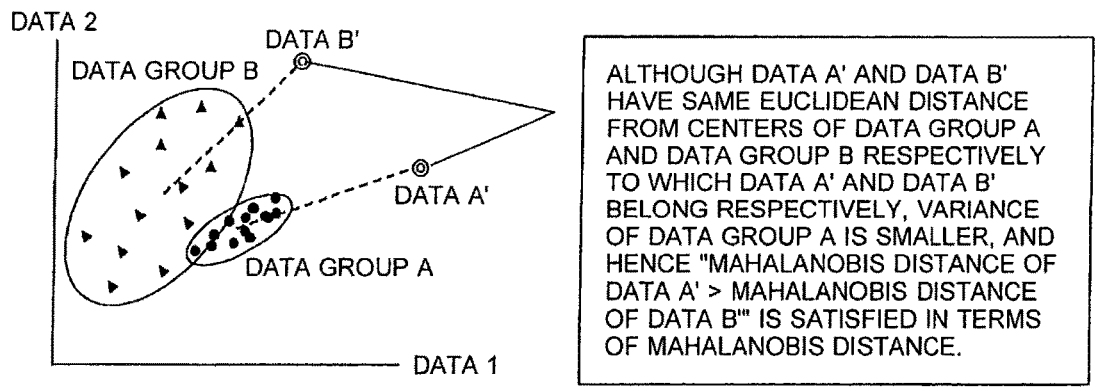
FIG. 4 is an explanatory diagram of a Mahalanobis distance, which is a condition change indicator of the consumer electric power control system according to Embodiment 1 of the present invention.

FIG. 4 is an explanatory diagram of the Mahalanobis distance, which is a condition change indicator of the consumer electric power control system 20 according to Embodiment 1 of the present invention.

The Mahalanobis distance is acquired as a distance from a data distribution in consideration of its variance. In a case where target data is a value away from the data distribution, the Mahalanobis distance increases by a larger amount when the variance of the data is smaller whereas the Mahalanobis distance increases by a smaller amount when the variance of the data is larger. For example, in FIG. 4, although data A' and data B' have the same Euclidean distance from centers of a data group A and a data group B respectively to which these data belong respectively, pieces of data are concentrated in a narrower range in the data group A than in the data group B, that is, the variance is smaller, and hence the data A' has a larger Mahalanobis distance than the data B'. In this manner, the Mahalanobis distance represents a degree of deviation from the data distribution or the tendency, and hence the Mahalanobis distance is used to detect an error or a condition change or the like.

Next, the consumer daily data creation unit 7 compares the previous Mahalanobis distance with the current Mahalanobis distance (S6), and when the current distance is smaller than the previous distance, the consumer daily data creation unit 7 holds the consumer data of the current distance as a candidate for the consumer daily data because the consumer data of the current distance is closer to the tendency of the current day (S7). Then, the consumer daily data creation unit 7 creates a next candidate for the consumer daily data by, for example, adding the consumer data on another day or replacing the current consumer data with the consumer data on another day. After that, the consumer daily data creation unit 7 determines whether or not Steps S1 to S7 are repeated for a predetermined number of times (S8), and when Steps S1 to S7 are repeated for the predetermined number of times, the consumer daily data creation unit 7 determines the consumer data having the smallest Mahalanobis distance, which is held at this time point, as the consumer daily data closest to the operation before the start of electric power reduction on the current day (S9). On the other hand, when Steps S1 to S7 are not repeated for the predetermined number of times, the consumer daily data creation unit 7 changes the extraction date of the consumer data (S10), and returns to Step S1 to execute the processing.

In the manner described above, the consumer daily data is acquired. Note that, approaches for acquiring the past data similar to the data on the current day as the consumer daily data may include extracting similar past data of the environment data 102 such as an outdoor temperature or determining and extracting similarities through use of other pattern recognition approaches. For example, a cluster analysis may be used to group past consumer data into a plurality of pieces of consumer daily data, to thereby determine which group the data on the current day belongs to.

The consumer daily data creation unit 7 may not only automatically extract data similar to the data on the current day to create the consumer daily data, but also extract and store the consumer daily data regularly at predetermined intervals such as on a seasonal basis, a monthly basis, or a weekly basis. Further, the manager of the consumer electric power control system 20 may give an instruction to execute the consumer daily data creation unit 7 when the operation tendency of the equipment is clearly to be changed from the past such as when the arrangement of equipment to be controlled or the seat layout of an area to be controlled is changed.

Figure 5:
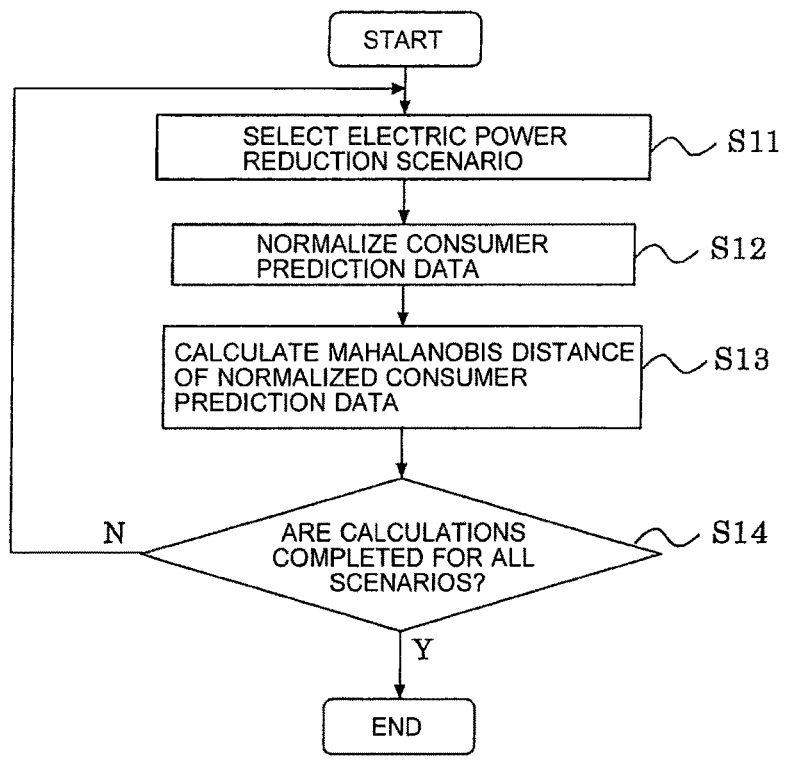
FIG. 5 is a processing flow diagram of a condition change indicator calculation unit of the consumer electric power control system according to Embodiment 1 of the present invention.

FIG. 5 is a processing flow diagram of the condition change indicator calculation unit 4 of the consumer electric power control system 20 according to Embodiment 1 of the present invention.

Next, the processing flow of the condition change indicator calculation unit 4 calculating the Mahalanobis distance is described below with reference to FIG. 5.

First, the condition change indicator calculation unit 4 selects a scenario to be evaluated from a plurality of electric power reduction scenarios (S11), and normalizes the consumer prediction data by Expression (1) using the average value and the variance acquired through the consumer daily data calculation (S12). Then, the condition change indicator calculation unit 4 acquires the Mahalanobis distance by Expression (3) using the correlation matrix of the normalized consumer prediction data and the consumer daily data (S13). After that, the condition change indicator calculation unit 4 repeats Steps S11 to S13 to acquire the Mahalanobis distances for all the electric power reduction scenarios (S14).

In the manner described above, the Mahalanobis distance is acquired.

Next, the equipment operation determination unit 5 compares the Mahalanobis distances of the consumer prediction data for respective electric power reduction scenarios with one another, determines an electric power reduction scenario having the consumer prediction data whose Mahalanobis distance is the smallest as the one that degrades the least comfortability and convenience, and determines the electric power reduction scenario as an equipment operation pattern to be used during the electric power reduction period. Note that, the Mahalanobis distances are acquired as instantaneous values at time intervals of the consumer prediction data, and these values may be processed to obtain the maximum value, the average value, the integrated value, and the like of the Mahalanobis distances during the electric power reduction period, to thereby employ these processed values as the determination condition.

Then, the equipment operation control unit 6 controls the electric power reduction target equipment and the non-electric power reduction target equipment based on the determined equipment operation pattern. As a result, it is possible to reduce the electric power as requested by the demand response and also reduce the degradation of comfortability and convenience to the minimum.

Through use of the consumer electric power control system 20 as configured above, it is possible to evaluate the influence on the degradation of comfortability and convenience of different types of equipment using a single evaluation indicator and easily determine the electric power reduction target equipment and the amount of reduction thereof in a case where the upper limit value of allowable electric power consumption is set by the demand response.

Further, through use of the Mahalanobis distance as the condition change indicator, it is possible to quantify the condition change in consideration of the degree of variation in daily operation data of the equipment.

Note that, the air-conditioning equipment 21 and the lighting equipment 22 are controlled in Embodiment 1, but the other equipment 23 such as an elevator or a PC may be included in the electric power reduction targets as illustrated in FIG. 1 as long as the other equipment 23 has a model capable of being predicted the electric power and the operating condition of the equipment.

Embodiment 2

Figure 6:
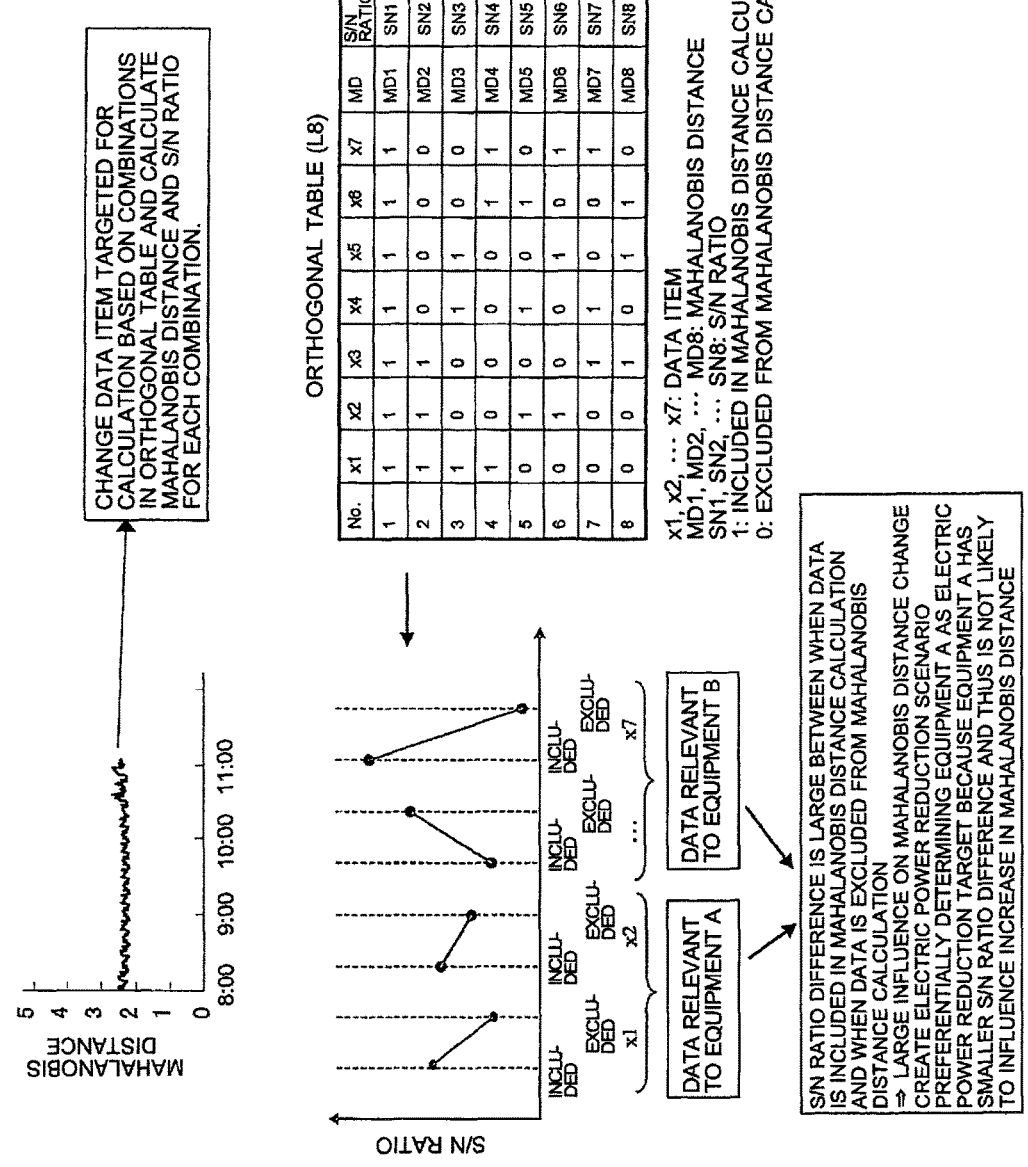
FIG. 6 is an explanatory diagram showing use of an S/N ratio difference in determination of electric power reduction target equipment by an electric power reduction scenario creation unit of a consumer electric power control system according to Embodiment 2 of the present invention.

FIG. 6 is an explanatory diagram showing use of an S/N ratio difference in determination of the electric power reduction target equipment by the electric power reduction scenario creation unit 2 of a consumer electric power control system according to Embodiment 2 of the present invention.

In the following, Embodiment 2 is described below, but a description is omitted for the same parts as in Embodiment 1.

When an electric power reduction scenario is created, the magnitude of influence on the degradation of comfortability and convenience during the electric power reduction is evaluated for each piece of equipment in advance, and the electric power reduction amount is preferentially allocated to a piece of equipment less influenced by the electric power reduction.

Note that, the magnitude of influence is determined using an S/N ratio, which is a ratio of signal to noise.

Specifically, sensitivity of the consumer data to the condition change indicator is analyzed using the S/N ratio as an evaluation indicator of the sensitivity analysis, and the electric power reduction amount is preferentially allocated to a piece of equipment having a lower sensitivity.

When the Mahalanobis distance is calculated, it is possible to recognize the magnitude of sensitivity of each data item of the consumer data to an increase in Mahalanobis distance by repeating the calculation with exclusion of several pieces of consumer data.

For example, it is assumed that data A has the most influence on the increase in Mahalanobis distance among three pieces of consumer data A, B, and C. Then, when the Mahalanobis distance is calculated with exclusion of the data A, the Mahalanobis distance becomes smaller because only the data B and the data C having less influence are considered. On the other hand, when the Mahalanobis distance is calculated with exclusion of the data B or the data C, the data A having more influence is considered, and hence the Mahalanobis distance does not become so small.

As described above, it is possible to recognize which data has the most influence by making the calculation with all the combinations of consumer data for calculating the Mahalanobis distance. Thus, for example, when there are seven kinds of consumer data, there are $2^7=128$ combinations in total, each combination specifying which data item is included or not to calculate the Mahalanobis distance. Further, the calculation amount can be reduced by making the calculation using an orthogonal table of the Taguchi method, which can grasp the overall tendency with a smaller number of combinations among the large number of combinations. For example, in the case of seven variables, the tendency can be covered with 8 combinations of calculation when an L8 orthogonal table is used. Note that, when the number of data items is different, another orthogonal table is used.

Figure 7:
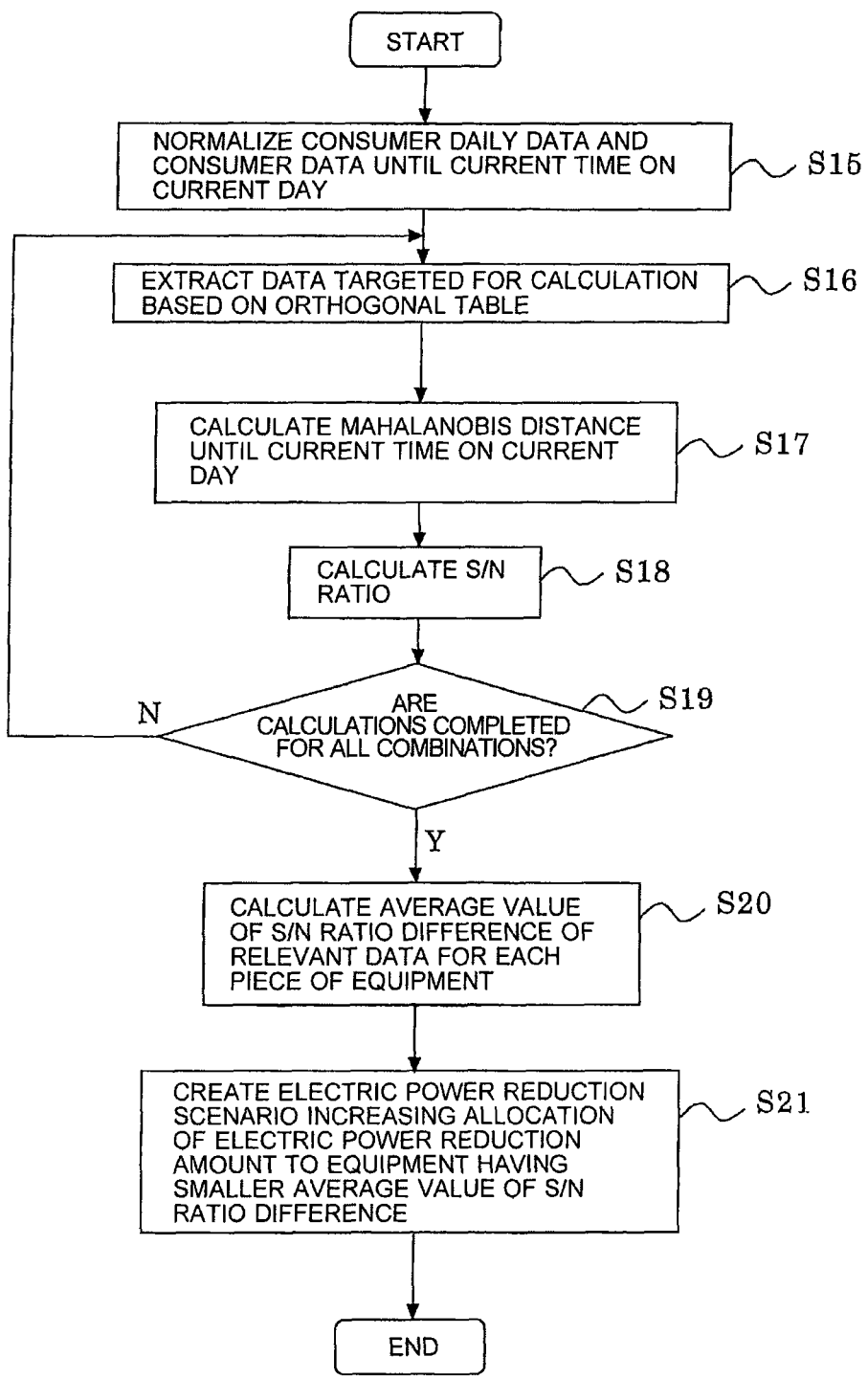
FIG. 7 is a processing flow diagram of the electric power reduction scenario creation unit of the consumer electric power control system according to Embodiment 2 of the present invention.

FIG. 7 is a processing flow diagram of the electric power reduction scenario creation unit 2 of the consumer electric power control system according to Embodiment 2 of the present invention.

Next, the processing flow of the electric power reduction scenario creation unit 2 creating the electric power reduction scenario is described below with reference to FIG. 7.

First, from among the consumer daily data and the consumer data on the current day that are normalized in Step S15, the electric power reduction scenario creation unit 2 extracts data targeted for calculation based on each combination of the orthogonal table shown in FIG. 6 (S16), and calculates the Mahalanobis distance (S17). The sensitivity of each consumer data to the change in Mahalanobis distance is represented by the S/N ratio. This means that as the S/N ratio increases, the combination of consumer data has more influence on the increase in Mahalanobis distance. Then, the S/N ratio for the n-th combination is calculated by Expression (4) (S18).

[Math. 4]

$$\eta_n = 10\log\frac{1}{k}\left(\sum_{j=1}^{k}\frac{1}{MD_j^2}\right) \quad (4)$$

In Expression (4), k denotes the number of samples in the determination period, MDj denotes the Mahalanobis distance for the j-th data item of each consumer data, $\eta_n$ denotes the S/N ratio for the n-th combination.

Next, the electric power reduction scenario creation unit 2 determines whether or not the calculations of the S/N ratios have been completed for all the combinations in the orthogonal table (S19), and repeats Steps S16 to S18 until all the calculations have been completed.

The S/N ratio can be acquired for each piece of consumer data by acquiring the average value of S/N ratios for combinations including the piece of consumer data targeted for calculation among the S/N ratios for all the combinations. For example, when the S/N ratio of the first consumer data is acquired, it is sufficient to acquire the average value of S/N ratios for combinations including the first consumer data in the orthogonal table. The S/N ratio of the first consumer data can be acquired in the L8 orthogonal table by averaging the S/N ratios for combinations 1 to 4 in the orthogonal table. In contrast, the S/N ratio when the influence of the first consumer data is excluded can be acquired by averaging the S/N ratios for combinations 5 to 8. The S/N ratio difference caused when each consumer data is considered or not considered can be acquired as shown in FIG. 6 by making these calculations for all the pieces of consumer data. The data having a larger S/N ratio difference caused when the data is included in or excluded from the Mahalanobis distance calculation is shown to have a higher sensitivity to the Mahalanobis distance change, and hence it is possible to identify the consumer data having a higher sensitivity to the Mahalanobis distance change.

Next, the electric power reduction scenario creation unit 2 calculates, for each piece of equipment, the average value of S/N ratio differences caused when pieces of consumer data relating to the piece of equipment are considered or not considered (S20), and determines that reducing the electric power of a piece of equipment having a smaller average value of the S/N ratio differences causes less influence on the degradation of comfortability and convenience, to thereby create an electric power reduction scenario preferentially allocating an electric power reduction amount to the piece of equipment (S21).

Through use of the consumer electric power control system as configured above, it becomes easier to select a piece of equipment having less influence on the degradation of comfortability and convenience to create the electric power reduction scenario.

Further, through the analysis of sensitivity of the consumer data to the condition change indicator, when the electric power reduction target equipment is determined, it becomes easier to narrow down the equipment having less influence on the degradation of comfortability and convenience.

Further, through use of the S/N ratio as the evaluation indicator of the sensitivity analysis, it is possible to easily determine the equipment having less influence because the degrees of influence caused when the electric power is reduced can be compared quantitatively among respective data items of the consumer data.

REFERENCE SIGNS LIST

1 electric power instruction value acquisition unit 2 electric power reduction scenario creation unit 3 consumer data prediction unit 4 condition change indicator calculation unit 5 equipment operation determination unit 6 equipment operation control unit 7 consumer daily data creation unit 10 consumer data storage unit 20 consumer electric power control system 21 air-conditioning equipment 22 lighting equipment 23 other equipment 101 equipment data 102 environment data

The invention claimed is:
1. A consumer electric power control system, comprising:
circuitry configured to:
store consumer data including equipment data indicating operating conditions of various types of equipment targeted for electric power management and environment data indicating operating environments of the various types of equipment targeted for electric power management,
create consumer daily data based on the stored consumer data in a past,
acquire an electric power instruction value including data on an electric power reduction start time, an electric power reduction period, and an electric power reduction amount,
create a plurality of electric power reduction scenarios based on the electric power instruction value, each of the plurality of electric power reduction scenarios including a combination of a piece of electric power reduction target equipment, an electric power reduction amount, an electric power reduction start time, and an electric power reduction period,
predict and acquire consumer prediction data including the consumer data in a case where the various types of equipment are controlled based on each of the plurality of electric power reduction scenarios, the consumer prediction data being different from the consumer daily data,
calculate a plurality of condition change indicators for the plurality of electric power reduction scenarios, each of the plurality of condition change indicators representing a degree of difference in tendency between the consumer prediction data and the consumer daily data, where an increase of the degree of difference in tendency represents degradation of comfortability and convenience in the various types of equipment, determine one of the plurality of electric power reduction scenarios based on the plurality of condition change indicators, and determine an equipment operation pattern based on the determined one of the plurality of electric power reduction scenarios, and control the various types of equipment based on the determined equipment operation pattern, wherein the circuitry controls the various types of equipment based on the determined equipment operation pattern to reduce the electric power as requested by a demand response and to reduce by a minimum amount the degradation of comfortability and convenience, in a case where an upper limit value of allowable electrical power consumption is set by the demand response.

2. The consumer electric power control system of claim 1, wherein the plurality of condition change indicators of a plurality of pieces of the consumer prediction data are compared with one another, and one of the plurality of electric power reduction scenarios corresponding to the consumer prediction data having a smallest value of one of the plurality of condition change indicators is determined as the equipment operation pattern.

3. The consumer electric power control system of claim 1, wherein each of the plurality of condition change indicators is a Mahalanobis distance.

4. The consumer electric power control system of claim 1, wherein the creating the plurality of electric power reduction scenarios based on the electric power instruction value includes analyzing a sensitivity of the consumer data to each of the plurality of condition change indicators, and preferentially allocating an electric power reduction amount to a piece of equipment having a lower sensitivity.

5. The consumer electric power control system of claim 4, wherein an evaluation indicator of the sensitivity analysis is an S/N ratio.

6. A consumer electric power control method, comprising:
creating consumer daily data based on consumer data in a past including equipment data indicating operating conditions of various types of equipment targeted for electric power management and environment data indicating operating environments of the various types of equipment targeted for electric power management;

acquiring an electric power instruction value including data on an electric power reduction start time, an electric power reduction period, and an electric power reduction amount;

creating a plurality of electric power reduction scenarios based on the electric power instruction value, each of the plurality of electric power reduction scenarios including a combination of a piece of electric power reduction target equipment, an electric power reduction amount, an electric power reduction start time, and an electric power reduction period;

predicting and acquiring consumer prediction data including the consumer data in a case where the various types of equipment are controlled based on each of the plurality of electric power reduction scenarios, the consumer prediction data being different from the consumer daily data;

calculating a plurality of condition change indicators for the plurality of electric power reduction scenarios, each of the plurality of condition change indicators representing a degree of difference in tendency between the consumer prediction data and the consumer daily data, where an increase of the degree of difference in tendency represents degradation of comfortability and convenience in the various types of equipment;

determining one of the plurality of electric power reduction scenarios based on the plurality of condition change indicators and determining an equipment operation pattern based on the determined one of the plurality of electric power reduction scenarios; and controlling the various types of equipment based on the determined equipment operation pattern;

wherein said controlling the various types of equipment based on the determined equipment operation pattern is to reduce the electric power as requested by a demand response and to reduce by a minimum amount the degradation of comfortability and convenience, in a case where an upper limit value of allowable electrical power consumption is set by the demand response.

7. The consumer electric power control method of claim 6, further comprising comparing the plurality of condition change indicators of a plurality of pieces of the consumer prediction data with one another, and determining one of the plurality of electric power reduction scenarios corresponding to the consumer prediction data having a smallest value of one of the plurality of condition change indicators as the equipment operation pattern.

8. The consumer electric power control method of claim 6, wherein each of the plurality of condition change indicators is a Mahalanobis distance.

9. The consumer electric power control method of claim 6, wherein each of the plurality of electric power reduction scenarios is created such that a sensitivity of the consumer data to each of the plurality of condition change indicators is analyzed and an electric power reduction amount is preferentially allocated to a piece of equipment having a lower sensitivity.

10. The consumer electric power control method of claim 9, wherein an evaluation indicator of the sensitivity analysis is an S/N ratio.

\* \* \* \* \*